United States Patent

LaSelle

[15] 3,654,521

[45] Apr. 4, 1972

[54] ELECTRONIC CARD MODULE THERMAL CLIP

[72] Inventor: Rush V. LaSelle, Pittsfield, Mass.

[73] Assignee: General Electric Company

[22] Filed: Jan. 13, 1971

[21] Appl. No.: 106,135

[52] U.S. Cl. ....................317/100, 174/15 R

[51] Int. Cl. ....................H05k 7/20, H02b 1/04

[58] Field of Search ....................174/DIG. 5, 15 R, 16 R; 317/100

[56] References Cited

UNITED STATES PATENTS

| | | | |
|---|---|---|---|
| 3,274,448 | 9/1966 | Disman | 317/100 |
| 3,327,180 | 6/1967 | Winter | 317/100 |
| 3,582,865 | 6/1971 | Franck | 317/100 |

*Primary Examiner*—Laramie E. Askin
*Assistant Examiner*—Gerald P. Tolin
*Attorney*—John F. McDevitt, Frank L. Neuhauser, Oscar B. Waddell and Joseph B. Forman

[57] ABSTRACT

A thermal clip is provided for an electronic card module which physically supports as well as conducts heat away from the module. The clip has a slotted construction and is fashioned from a metal sheet so as to have a hollow interior cavity which contains a metal-filled elastomeric material that is in physical contact with edge elements of the module. The clip member is supported by metal frame means which houses a plurality of modules and said frame can have a hollow interior for passage of a gaseous coolant to help conduct heat away from the modules. Additional heat removal can be provided in the form of a cold plate which carries liquid coolant and contacts the support frame for the modules.

10 Claims, 2 Drawing Figures

INVENTOR
RUSH V. La SELLE

BY J. F. McDevitt

HIS ATTORNEY

Patented April 4, 1972 3,654,521

2 Sheets-Sheet 2

INVENTOR
RUSH V. La SELLE

BY J.F. McDevitt
HIS ATTORNEY

ELECTRONIC CARD MODULE THERMAL CLIP

DETAILED DESCRIPTION OF THE INVENTION

Figure 1:
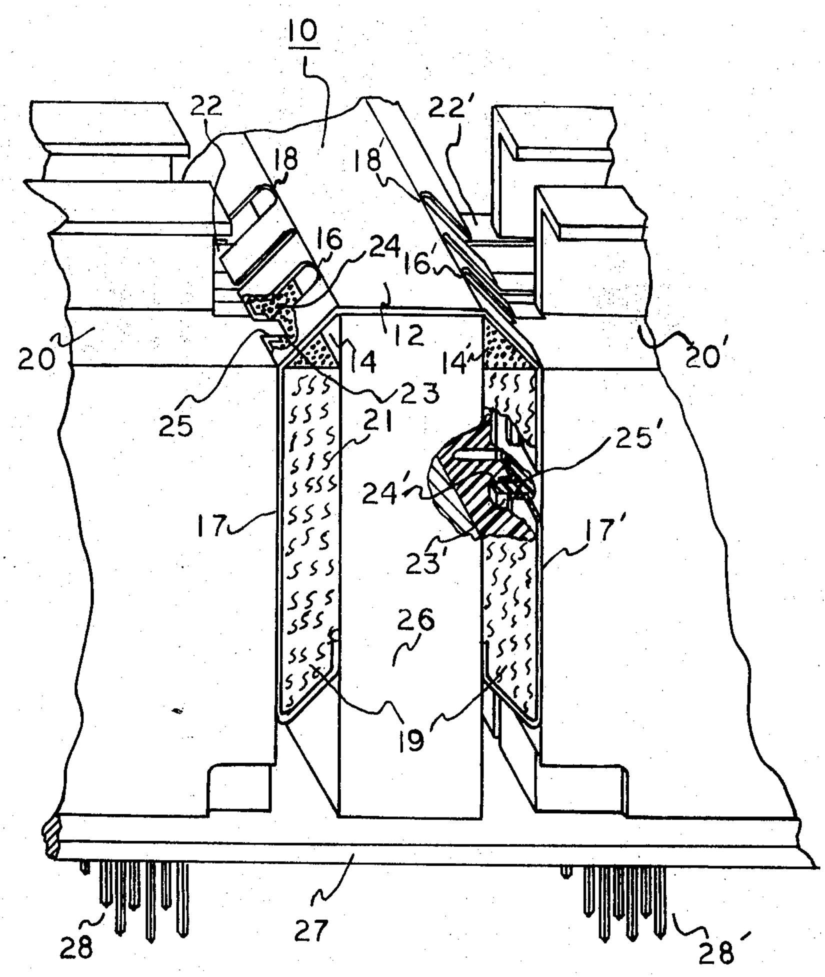

The present invention relates to improved means for conducting heat away from one or more electronic card modules. More particularly, the present invention provides a thermal clip which contacts the edge elements of an electronic card module so as to position and support the module as well as conduct heat away therefrom to associated cooling structure in a plug-in module array. The present thermal clip is particularly adapted for use with interchangeable or replaceable modules of the same size which form electrical circuits of a modern electronic system. The combined packaging and heat-sink construction of the present cooling structure provides simple and effective means to further miniaturize the assembly of a modular electronic system.

An important object of the invention is to provide improved structure for packaging an electronic card module so as to conduct the heat generated by said module to some remote location in the apparatus.

Another important object of the present invention is to provide cooling means for an electronic card module which introduces less thermal resistance than found with a conventional module support.

Still another object of the invention is to provide cooling means for an assembly of electronic card modules which avoids contamination of the modules from the coolant.

These and other objects, features, and advantages of the present invention will become apparent upon consideration of the following detailed description when considered in connection with the accompanying drawings which illustrate preferred embodiments of the present invention.

Figure 2:
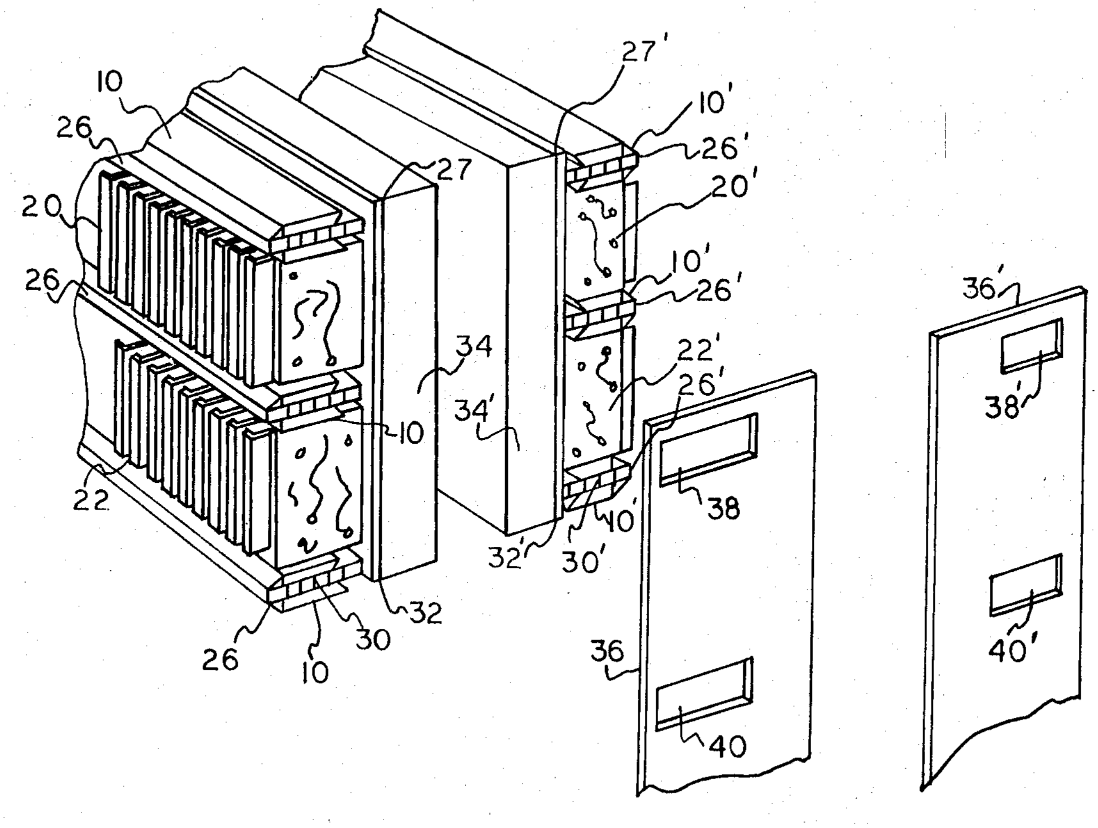

In the drawings:

FIG. 1 is a perspective view depicting thermal clip means of the present invention, and FIG. 2 is a perspective view depicting associated cooling structure which can be employed advantageously with the thermal clip means of the present invention.

In FIG. 1 there is shown a three-dimensional view of novel thermal clip means together with module components being held by said clip means in a support frame from which the clip member is suspended. More particularly, thermal clip means 10 is in the form of a slotted U-shaped design metal member 12 with hollow cavity portions 14 and 14' along with a series of slots on each leg portion 17 and 17' of the member as exemplified at 16, 16', 18 and 18'. The hollow cavity in each leg of the clip contains an elastomeric material 19 which has been filled with particles 21 of a heat-conductive substance so as to improve thermal conductivity through said elastomeric material. A beryllium-copper alloy sheet or other metal having superior thermal conduction characteristics and mechanical spring flexibility provides a suitable material of construction to form the clip member. The composition of the elastomeric material has also not been found critical and a natural or synthetic polymer material exhibiting approximately 10 percent compression under a 100 psi compressive force and which recovers its original form when the force is removed can be used in practice of the present invention. Likewise, adequate thermal conductivity can be provided in the elastomeric material by incorporating finely divided metal solids, metal fibers, or beryllium oxide so that filled elastomer exhibits a thermal conductivity of around 30 BTU/hr/ft$^2$/° /inch. By filling the hollow interior cavity of the clip member with such elastomeric material so that said material is physically urged in contact with edge elements of a suspended module as well as the inner walls of the clip member, it becomes possible to maintain physical contact with more than 50 percent of the available end surface area along opposite edges of the module.

Clip member 12 positions and supports module components 20, 20', 22 and 22'. Edge elements 23–23' and 24–24' of said modules are suspended by interference fit in the slots of the clip member and thermal conductivity is provided by contact with inner walls 25 and 25' of the clip member as well as elastomeric material contained within the hollow interior of said clip member. Physical contact of the module edge elements with both the metal clip and the elastomeric material introduces less thermal resistance than occurs with a metal interface alone due to discontinuous contact when the latter structure is employed. Surprisingly, the improvement in heat conduction provided by the present clip means has been found to be at least a two-fold decrease in thermal resistance when compared with a metal clip of comparable dimensions but not containing a filler and disposed as above described.

Metal support frame 26 provides structural support for the suspended clip 12 which exerts physical pressure against the sides of the frame to afford good thermal conduction therebetween. Said frame is constructed from a metal having superior thermal conduction such as aluminum and provides the primary path of heat removal from the suspended modules. The heat removed from the suspended modules is transferred to a remote location of the modular system equipment (not shown) by passage from support frame 26 to a metal base member 27 which also contains electrically insulated terminal blocks (not shown) in which the module components are plugged. Electrical terminal pins 28 and 28' serve to provide an electrical path from the module components to other electronic circuits in the equipment.

In FIG. 2 there is shown a three-dimensional view for an electronic card module thermal clip assembly of the present invention having additional cooling structure to enable greater heat removal from the suspended electronic modules. The same numerical identification of components used in FIG. 1 has been retained to the extent possible for clarity and simplicity of illustration in the description of the present embodiment. Accordingly, clip means 10 and 10' are affixed to support frame members 26 and 26' in the same manner heretofore described with regard to the FIG. 1 embodiment and provide positioning means for module components 20, 20', 22 and 22'. Said frame members are all of a hollow construction to provide a convection cooling path in the assembly having minimum flow losses. The hollow interior portions of said support frames serve as the guide means for passage of a gaseous heat transfer fluid through the assembly to carry out heat removal from the modules by convection as well as conduction. The spacing of fin elements 30 in the hollow interior passageways of said support frame members furnishes additional heat transfer surface area in the assembly to still further assist with heat removal from the modules. Physical contact is provided between base surfaces 27 and 27' of the support frame members and abutting heat transfer surfaces 32 and 32' of cold plate members 34 and 34' in said assembly to furnish a heat conduction path from the modules. The cold plate members are of a hollow metal construction for passage of a liquid coolant therethrough and help remove the heat supplied by conduction from the support frame members. Electrical interconnection of the suspended module components is accomplished in the same manner described for the FIG. 1 embodiment by plug-in terminal blocks secured to the base surfaces 26 and 26' which are interposed between the support frames and subjacent heat transfer surfaces of the cold plate members. Baffle members 36 and 36' direct a stream of air or other gaseous coolant to the hollow passageways of the support frame members by means of apertures 38–38' and 40–40', respectively, and serve as a barrier to direct contact between said coolant and the module surfaces.

In operation, the above embodied electronic card module thermal clip assembly removes heat from the suspended modules by thermal conduction as well as by thermal convection. Avoidance of physical contact between the gaseous coolant and the module surfaces precludes undesirable condensation of moisture upon exposed surfaces if ordinary air is used as a coolant and air inlet temperatures are significantly below ambient temperature. Further contamination of the modules by other materials suspended in the air stream is also avoided by using this technique of the present invention. By adding liquid cooling means in the assembly in the manner hereinbefore described there is provided a structural support member providing superior heat removal than can be obtained by convention cooling except with excessive volume flow of a gaseous cooling medium.

It will be apparent from the foregoing description that variations can be made in the electronic card module thermal clip and thermal clip assembly without departing from the true spirit and scope of this invention. It is not intended to limit the invention, therefore, to the scope of the preferred embodiments above described since it will be apparent that various modifications are possibly within the scope of the appended claims.

What is claimed as new and desired to be secured by Letters Patent of the United States is:

1. An electronic card module cooling means which comprises metal clip means in physical contact with edge elements of an electronic card module which metal clip means include a hollow cavity having access to said edge elements, and elastomeric material occupying said cavity so as to be physically urged in contact with said edge elements as well as with the inner walls of the said metal clip means, said elastomeric material being filled with a particulate heat-conductive substance so as to improve the thermal conductivity of the elastomeric material.

2. Thermal clip means as in claim 1 wherein the particulate filler of the elastomeric material comprises a solid metal.

3. Thermal clip means as in claim 2 wherein the clip consists of a spring member.

4. Thermal clip means as in claim 3 wherein the interface occupied by the thermal clip represents at least fifty percent of the available end surface area along opposite edges of suspended electronic card module.

5. An electronic card module cooling assembly which comprises metal clip means in physical contact with edge elements of an electronic card module, which metal clip means includes a hollow cavity having access to said edge elements, elastomeric material occupying the hollow cavity of said metal clip means so as to be physically urged in thermal contact with said edge elements as well as the inner walls of said metal clip means, said elastomeric material being filled with a particulate heat-conductive substance so as to improve the thermal conductivity of the elastomeric material, and heat conductive means in physical contact with said metal clip means.

6. An electronic card module thermal clip assembly as in claim 5 wherein said heat-conductive means comprises a support frame for the electronic card module.

7. An electronic card module thermal clip assembly as in claim 6 which further includes guide means for passage of a gaseous heat-transfer fluid in contact with the support frame.

8. An electronic card module cooling assembly which comprises metal clip means in physical contact with edge elements of an electronic card module, which metal clip means includes a hollow cavity having access to said edge elements, elastomeric material occupying the hollow cavity of said metal clip means so as to be physically urged in contact with said edge elements as well as the inner walls of said metal clip means, said elastomeric material being filled with a particulate heat-conductive substance so as to improve the thermal conductivity of the elastomeric material, guide means for passage of a gaseous heat-transfer fluid so as to be in heat-transfer relationship but not in physical contact with said metal clip means, and a heat-transfer surface in heat-transfer relationship with said guide means and being supplied with a liquid heat-transfer fluid not in physical contact with the gaseous heat-transfer fluid or the guide means.

9. An electronic card module cooling assembly as in claim 8 wherein the guide means form an integral part of a heat-conductive support frame for the electronic card module.

10. An electronic card module thermal clip assembly as in claim 8 wherein the module support frame and heat-transfer surface are in physical contact.

* * * * *